(12) United States Patent
Pascual Pinedo et al.

(10) Patent No.: US 11,731,222 B2
(45) Date of Patent: Aug. 22, 2023

(54) METHOD FOR ASSEMBLING A ROLLER CONVEYOR, AND TENSIONING DEVICE FOR USE IN SUCH A METHOD

(71) Applicant: Vanderlande industries B.V., Veghel (NL)

(72) Inventors: Eduardo Pascual Pinedo, Cornellà de Llobregat (ES); Christian Schneeberger, Cornellà de Llobregat (ES); Victor Sanz Juárez, Cornellà de Llobregat (ES); Iván Serrano González, Cornellà de Llobregat (ES); Jaume Feliu Sánchez, Cornellà de Llobregat (ES)

(73) Assignee: Vanderlande Industries B.V., Veghel (NL)

( * ) Notice: Subject to any disclaimer, the term of this patent is extended or adjusted under 35 U.S.C. 154(b) by 0 days.

(21) Appl. No.: 17/959,655

(22) Filed: Oct. 4, 2022

(65) Prior Publication Data
US 2023/0105239 A1    Apr. 6, 2023

(30) Foreign Application Priority Data

Oct. 5, 2021   (EP) .................................... 21382894

(51) Int. Cl.
*B23P 19/04*     (2006.01)
*B23P 15/00*     (2006.01)
(Continued)

(52) U.S. Cl.
CPC .............. *B23P 19/04* (2013.01); *B23P 15/00* (2013.01); *B65G 23/44* (2013.01); *B65G 13/07* (2013.01);
(Continued)

(58) Field of Classification Search
CPC ........ B65G 13/07; B65G 13/11; B65G 39/12; B65G 21/06; B65G 23/44; B23P 15/00; B23P 19/04; B25B 27/00; Y10T 29/53683
See application file for complete search history.

(56) References Cited

U.S. PATENT DOCUMENTS 4,221,288 A * 9/1980 Rae ........................ B65G 13/07
198/781.08
4,325,474 A * 4/1982 Rae ...................... B65G 47/261
198/781.04
(Continued)

FOREIGN PATENT DOCUMENTS

DE     202010015597 U1    3/2012
DE     202012002333 U1    3/2012
(Continued)

*Primary Examiner* — Matthew P Travers
(74) *Attorney, Agent, or Firm* — Carter, DeLuca & Farrell LLP

(57) ABSTRACT

The invention relates to a method for assembling a roller conveyor having rollers for products, each having a cylindrical roller body and a first and second support element on opposite ends of the roller body, the second support element having pulley means; providing a frame having a first and second frame part for mounting therebetween the rollers; and, for the purpose of mounting a roller to the frame: mounting the first support element to a first mounting provision of the first frame part; passing a drive element and a further drive element over the pulley means of the roller; tensioning the drive element by exerting a force on the roller by means of a tensioning device; mounting the second support element of the roller to a second mounting provision of the second frame part while keeping the drive element tensioned; and removing the tensioning device from the roller.

10 Claims, 5 Drawing Sheets

(51) Int. Cl.
*B65G 23/44* (2006.01)
*B65G 39/12* (2006.01)
*B65G 13/07* (2006.01)
*B65G 13/11* (2006.01)
*B65G 21/06* (2006.01)

(52) U.S. Cl.
CPC .............. *B65G 13/11* (2013.01); *B65G 21/06* (2013.01); *B65G 39/12* (2013.01)

(56) References Cited

U.S. PATENT DOCUMENTS

| | | | | |
|---|---|---|---|---|
| 5,048,661 | A | * | 9/1991 | Toye ...................... B65G 39/12 384/537 |
| 5,191,917 | A | | 3/1993 | Krumm et al. |
| 11,008,176 | B1 | * | 5/2021 | Van Kleef .............. B65G 39/12 |

FOREIGN PATENT DOCUMENTS

| | | |
|---|---|---|
| DE | 102019101473 A1 | 7/2020 |
| FR | 2990688 A1 | 11/2013 |

\* cited by examiner

METHOD FOR ASSEMBLING A ROLLER CONVEYOR, AND TENSIONING DEVICE FOR USE IN SUCH A METHOD

CROSS-REFERENCE TO RELATED APPLICATION

The present application claims the benefit of and priority to European Application No. 21382894.0 filed Oct. 5, 2021. The entire contents of which are incorporated herein by reference.

SUMMARY

The invention relates to a method for assembling a roller conveyor having a plurality of successive, driven rollers mounted at a predefined pitch on a frame of the roller conveyor, the successive rollers supporting and conveying products in use of the roller conveyor. The invention also relates to a tensioning device for use in such a method.

Such roller conveyors are frequently used in the transport of products, such as luggage items or parcel items in a warehouse.

An object of the invention is to provide an efficient manner of assembling a roller conveyor.

The above object is achieved by the method according to the invention, as defined in claim 1, for assembling a roller conveyor having a plurality of successive, driven rollers mounted at a predefined pitch on a frame of the roller conveyor, the successive rollers supporting and conveying products in use of the roller conveyor, the method comprising the steps of:
providing the plurality of successive rollers each having a cylindrical roller body and a first and a second support element on respective opposite ends of the roller body, the second support element having pulley means,
providing a frame having a first and a second, mutually parallel, elongate frame part for mounting therebetween the plurality of successive rollers, wherein the first and second frame part each have a plurality of mounting provisions spaced apart at the pitch,
the method further comprising, for the purpose of mounting a roller of the plurality of rollers to the frame, the further steps of:
mounting the first support element of a roller to a first mounting provision of the first frame part while leaving the opposite second support element of that roller free from a second mounting provision of the second frame part,
passing an endless flexible drive element and a further endless flexible drive element over the pulley means of the roller,
wherein the drive element also passes over the pulley means of a previously mounted neighboring roller and wherein the further drive element is still to be passed about another neighboring roller still to be mounted,
tensioning the drive element by exerting a force on the roller by means of a tensioning device,
mounting the second support element of the roller to the second mounting provision while keeping the drive element tensioned by the tensioning device, and then removing the tensioning device from the roller.

An effect of the method according to the invention is that a very efficient assembling of the roller conveyor is achieved by first only mounting the first support element of the roller to the frame and passing the mentioned drive elements over the pulley means of the roller, after which the drive element is tensioned using a tensioning device and the second support element is mounted to the frame while the drive element is kept tensioned, after which the tensioning device is removed. This way, each time a further roller can be mounted in the same and highly efficient manner, thereby efficiently and quickly assembling the roller conveyor.

Such tensioning of the flexible drive element is relevant for the drive element being able to transfer a drive torque between first and a second pulley means of respective neighboring rollers. Tensioning the drive element by forcing the roller away from a previously mounted neighboring roller results in the second support element being brought in the position in which it can be mounted to the second frame part in a very easy manner. After said mounting, the tensioning device can be removed, wherein the drive element remains tensioned so that it can effectively be used to drive a roller.

The driven rollers of the roller conveyor may be driven by a drive motor, preferably an electric motor, coupled to one of the rollers such as via a further endless flexible drive element. The rollers may be coupled in a series configuration, with each time two neighboring rollers being drivingly coupled via an endless flexible drive element. This way, a single drive motor may drivingly rotate the plurality of rollers of the roller conveyor.

In an embodiment, the pulley means may comprise one pulley over which two drive elements may be passed, or may comprise two individual pulleys over each of which a drive element may be passed. The endless flexible drive elements may be drive belts, such as flat belts, V-belts, or poly-V belts. The latter are preferred.

In an embodiment, the first mounting provisions of the first frame part are formed by a plurality of first passages spaced apart at the pitch in a first base part of the first frame part, each passage for receiving therein a first support element of one of the plurality of rollers and for preventing the first support element from moving perpendicular to a longitudinal direction of the roller. This provides for a very simple and robust mounting of the roller to the first frame part. The first support element may have a pin which is received in the passage when mounted.

In an embodiment, the second frame part has a plurality of second passages spaced apart at the pitch, through each of which passages a roller body can pass, wherein for the purpose of the step of mounting the first support element, the roller is at least temporarily moved with at least a part of its roller body through a passage of said series of passages. Such second passages make a very easy mounting of the first support element possible, while at the same time providing a guard preventing access from above the rollers to the pulley means. The second passages may be holes which are slightly larger than an outer diameter of the roller bodies, such as having a diameter of between 5 and 15 percent larger than that of the roller bodies.

In an embodiment, for the purpose of the step of tensioning the drive element by exerting a force on the roller, a force is exerted on the roller body. Since the roller bodies are easily accessible at least from above, this increases the ease of the mounting of the roller to the frame.

In an embodiment, for the purpose of the step of tensioning the drive element by exerting a force on the roller, the tensioning device is placed between the roller and a previously mounted neighboring roller thereof.

In an embodiment, each second mounting provision has a removable bracket which can be fixated onto a second base part of the second frame part, wherein for the purpose of the mounting of the second support element of the roller to the second mounting provision while keeping the drive element tensioned by the tensioning device, the bracket is fixated to the base part. Such removable brackets make the mounting of the second support element very easy. Also, they make maintenance very efficient. The bracket may in an embodiment be mounted to the second base part by means of a screw connection.

In an embodiment, the removable bracket has a bracket passage for receiving therein the second support element of the roller and for preventing the second support element from moving perpendicular to a longitudinal direction of the roller. In an embodiment, the bracket and the second base part enclose the pulley means of the roller between them at least in a fixated condition of the bracket on the second base part, increasing the safety of the conveyor. The second support element may comprise a pin which is received in the bracket passage when mounted.

In an embodiment, the bracket and the second base part enclose the pulley means between them at least in a fixated condition of the bracket on the second base part, wherein the second base part has a C-shaped cross section wherein the bracket, in said fixated condition, bridges a gap between ends of legs of the C-shape. Such a construction provides a relatively stiff second base part, while at the same time forming a guard for the pulley means, which increases the safety of the conveyor.

In an embodiment of the method in which several of the above mentioned embodiments are combined, for the purpose of the step of mounting the first support element of the roller,
the roller is at least temporarily moved with at least a part of its roller body through a second passage, after which the first support element is moved towards the first frame part such that the first support element of the roller is received in a passage in the first base part,
wherein subsequently, for the purpose of the step of tensioning the drive element by exerting a force on the roller,
a force is exerted on the roller body,
after which, for the purpose of the step of mounting the second support element to the second mounting provision,
the bracket is positioned such that the second support element is received in the bracket passage, after which
the bracket is fixated to the second base part.

The invention also relates to a tensioning device for use in a method according to the invention, which method is for assembling a roller conveyor having a plurality of successive, driven rollers mounted at a predefined pitch on a frame of the roller conveyor, the successive rollers supporting and conveying products in use of the roller conveyor,
the tensioning device being configured for tensioning an endless flexible drive element passed about respective pulley means of two neighboring rollers of the roller conveyor of which a first roller has already been mounted to the frame of the device and the other roller is to be mounted to the frame,
the tensioning device having a body part, a first pusher body for contacting the first of the two rollers, fixated on the body part and a second pusher body movably provided on the body part, for contacting the roller to be mounted to the frame,
the tensioning device further having a cam between the first and second pusher body, such that pivoting the cam about a pivot axis thereof results in the cam forcing the second pusher body away from the first pusher body thereby exerting a force on the roller to be mounted, thereby tensioning the drive element.

Such a tensioning device is a very simple and easy-to-use device for effectively tensioning the drive element upon mounting the roller to the frame. Effects relating to the method of the invention described above also apply in a similar manner to the tensioning device of the present invention.

In an embodiment, the first and second pusher bodies are configured for contacting the respective roller bodies of the two rollers. Since the roller bodies are easily accessible at least from above, this increases the ease of the mounting of the roller to the frame.

In an embodiment, the second pusher body is spring loaded on the cam. This way, upon taking away the force by pivoting the cam, the second pusher body removes itself from the roller as a result of a spring force, which makes the positioning of the device between two rollers and the removal of the device from between two rollers very easy and user-friendly.

The cam of the tensioning device may be operated by means of a drive motor such as a servo motor or a stepper motor, for example, or by means of an hydraulic or pneumatic cylinder, for example. In an embodiment for manual operation, the tensioning device may have a lever connected to the cam, which lever is configured be manually operated and is configured such that upon pivoting the lever about a pivot axis thereof, the cam pivots about its pivot axis as well.

In an embodiment, the lever and cam have been designed such that a force ratio between a pivoting force on a free end of the lever and a force exerted by the cam on the second pusher body is at least 5, preferably at least 10.

BRIEF DESCRIPTION OF DRAWINGS

The present invention is described hereinafter with reference to the accompanying schematic figures in which embodiments of the present invention are shown and in which like reference numbers indicate the same or similar elements.

DETAILED DESCRIPTION

Figure 1:
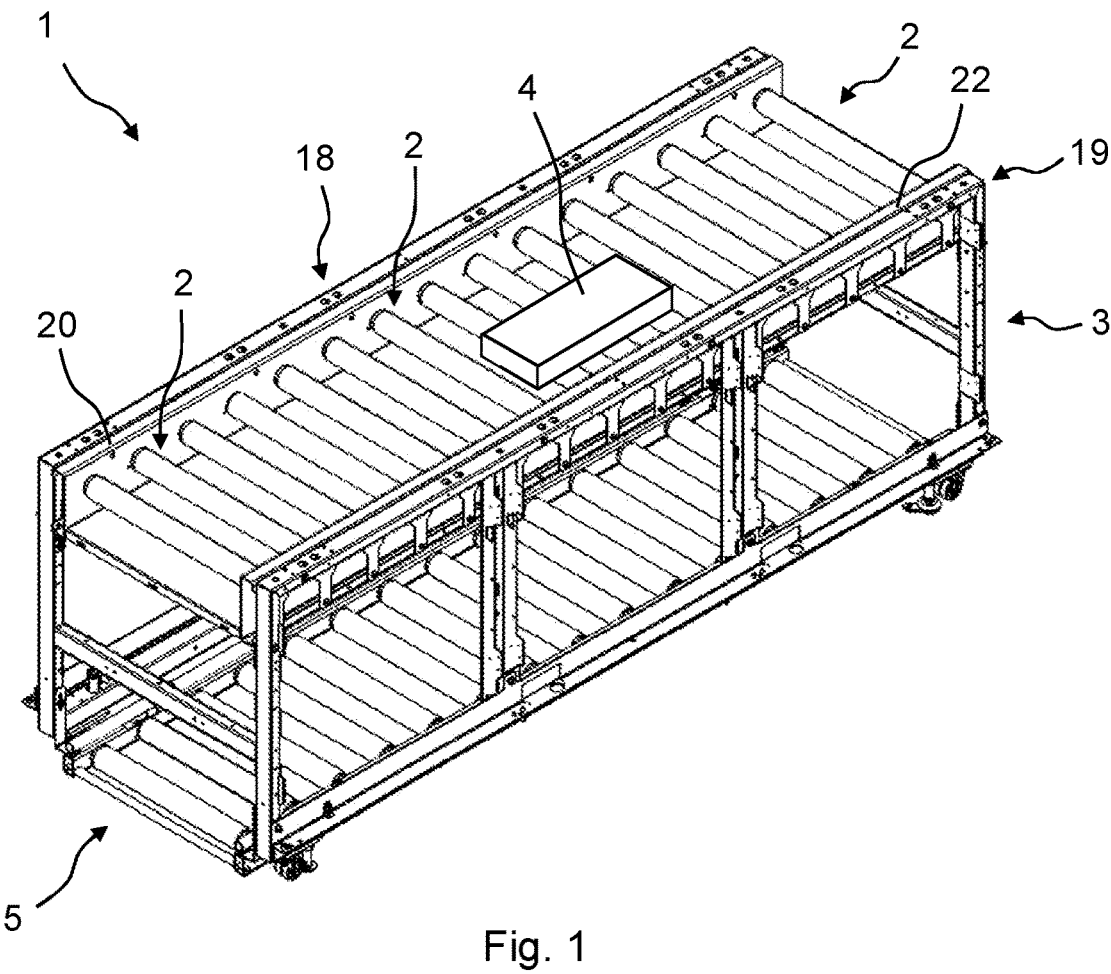
FIG. 1 shows, in 3-dimensional view, an example of a roller conveyor assembled using an example of a method according to the present invention.
Figure 2A:
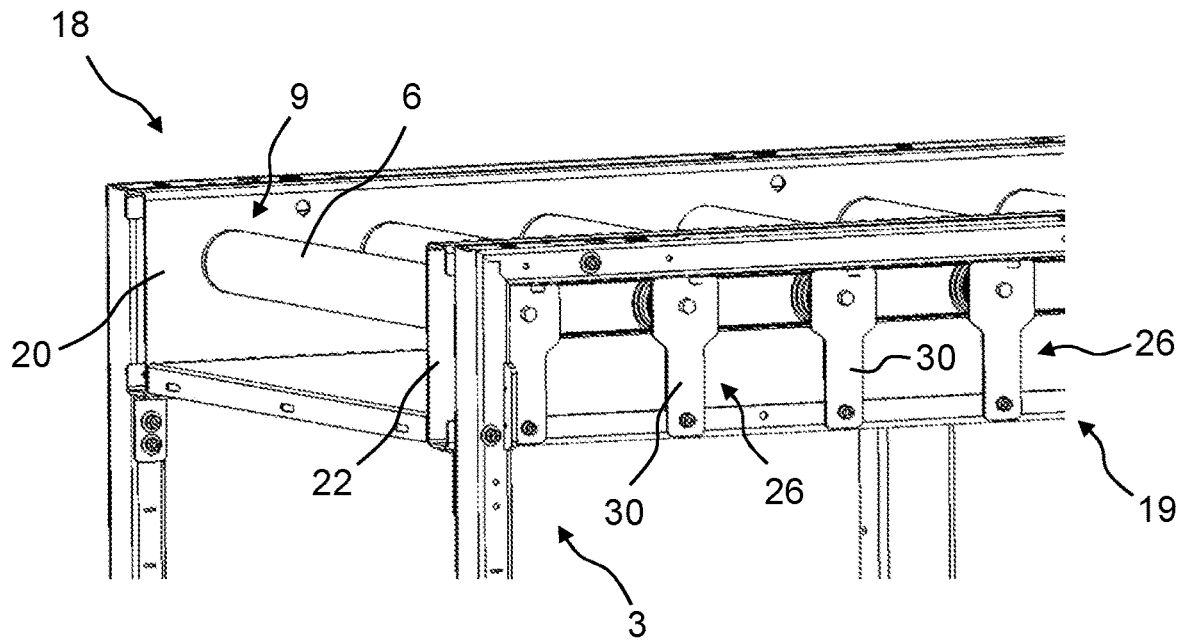
FIG. 2A and 2B show respective parts of the conveyor of FIG. 1 seen obliquely from the front and from the back.
Figure 2B:
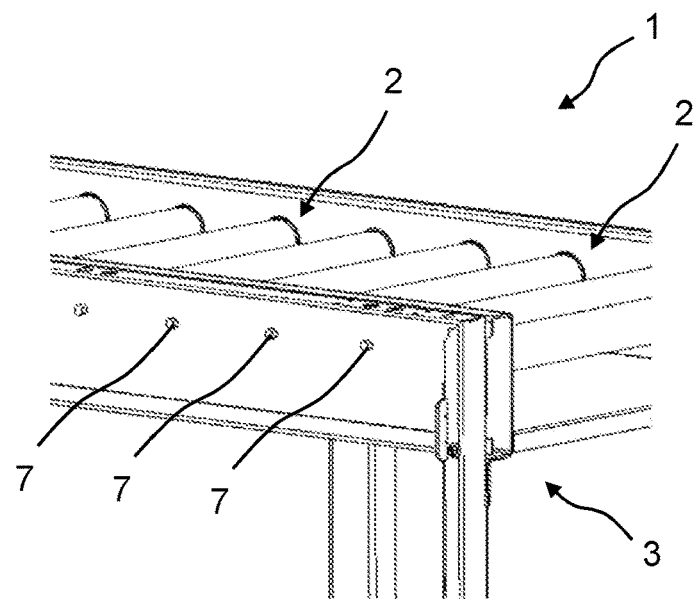

FIG. 1 shows a roller conveyor 1 assembled using an example of a method according to the present invention. The roller conveyor 1 has a plurality of successive, driven rollers 2 (only a few of the total of 15 rollers have been given a reference numeral). The rollers 2 are mounted at a predefined pitch p (see FIG. 4) on a frame 3 of the roller conveyor 1. Although the conveyor 1 has a 'length' of 15 rollers, in practice a shorter conveyor or a (much) longer conveyor may be used. The conveyor 1 as shown in FIG. 1 may form a module of a conveyor system having multiple successive such conveyors forming a conveying path. The successive rollers 2 are configured to support and convey products, like product 4. Although conveyor 1 has an additional series of lower rollers 5 below the plurality of rollers, the presence of such lower rollers is not relevant for the present invention. The conveyor 1 may or may not have further provisions below the rollers 2, like the shown series of lower rollers. A height of the frame may be set in dependence on application requirements.

The example of the method of the invention comprises providing the plurality of rollers 2 and providing the frame 3. Each of the successive rollers 2 has a cylindrical roller body 6, and a first supporting element 7 and a second support element 8 on respective opposite ends 9 and 10, respectively, of the roller body 6. The second support element 8 has pulley means for coupling the roller 6 with both its neighboring rollers 6 via respective endless flexible drive elements, at least in the present example formed as drive belts 12. The drive belts 12 may for example be poly-V belts as shown in the figures. The pulley means are formed as one pulley 11 over which two drive belts 12 may be passed. The frame 3 has a first and a second, mutually parallel, elongate frame part 18 and 19, respectively, for mounting therebetween the plurality of successive rollers 2. The first 18 and second 19 frame part each have a plurality of mounting provisions 24 and 26, respectively, spaced apart at the pitch p.

The first mounting provisions 24 of the first frame part 18 are formed by a plurality of first passages spaced apart at the pitch p in a first base part 20 of the first frame part, each passage for receiving therein a first support element 7 of one of the plurality of rollers 2 and for preventing the first support element 7 from moving perpendicular to a longitudinal direction 34 of the roller 2. The first support element 7 is formed as a pin which merely needs to be slid through a passage formed in the base part 20 of the first frame part 18. The roller body 6 can rotate with respect to the pin. The roller body 6 is coupled for rotation to the pulley 11.

Figure 3:
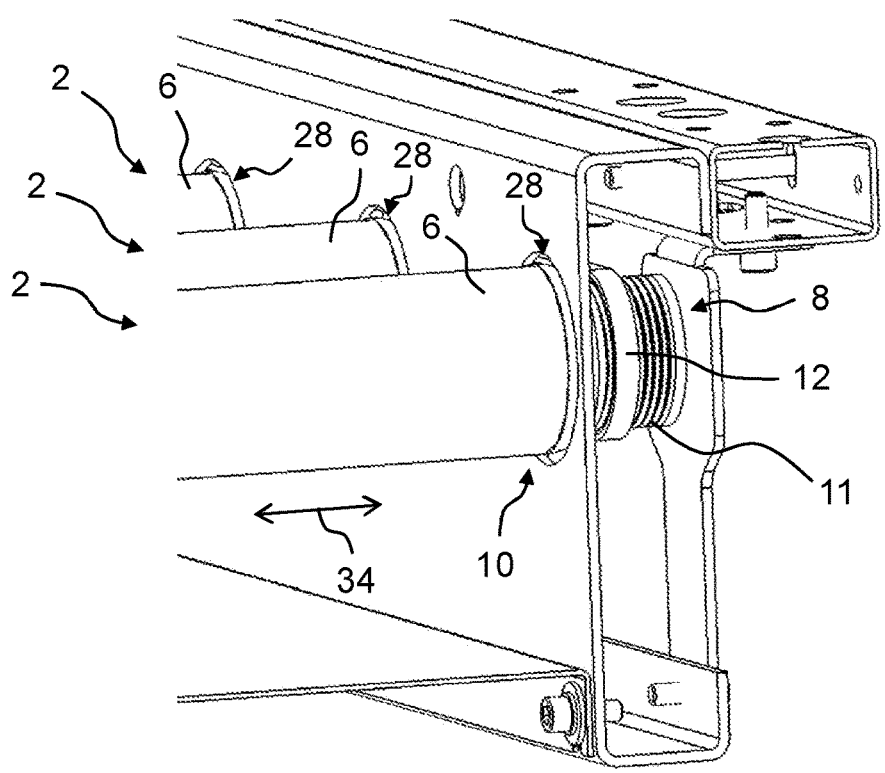
FIG. 3 shows a part of the conveyor in FIG. 1 seen in a different perspective and in more detail.
Figure 4:
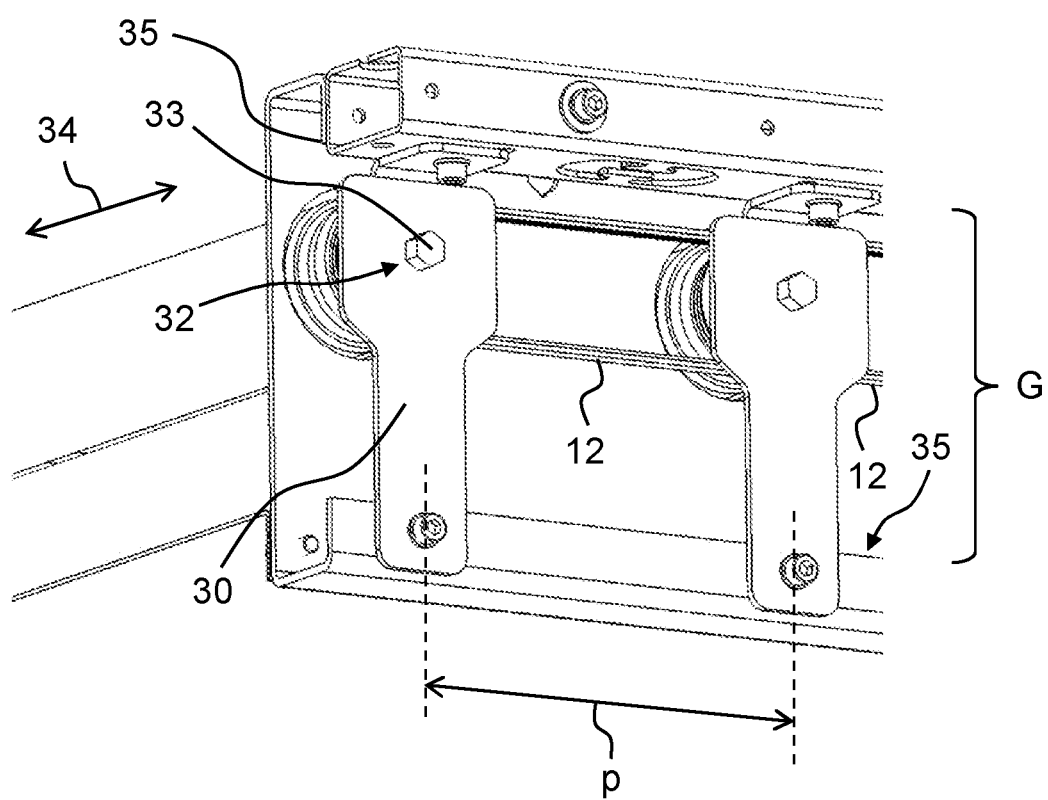
FIG. 4 shows the part of the conveyor of FIG. 3 from a different perspective.

The second frame part 19 has a plurality of second passages 28 spaced apart at the pitch p, through each of which passages 28 a roller body 6 can pass as FIG. 3 shows. Each second mounting provision 26 has a removable bracket 30 which can be fixated onto a second base part 22 of the second frame part 19. The removable bracket 30 has a bracket passage 32 for receiving therein the second support element 8, more specifically a pin 33 of the second support element 8, of the roller 2 and for preventing the second support element 8 from moving perpendicular to the longitudinal direction 34 of the roller 2. As can be understood from FIG. 4, the hexagonal pin 32 merely needs to pass through the correspondingly shaped bracket passage 23 and the same holds for the first support element 7 mounted to the first mounting provision 24. That means, in principle, no lock nut or the like needs to be mounted to either of the first and the second support elements 7, 8. The bracket 30 and the second base part 22 enclose the pulley 11 of the roller 2 between them at least in a fixated condition of the bracket 30 on the second base part 22, as FIGS. 3 and 4 show in particular. The second base part 22 has a C-shaped cross section wherein the bracket 30, in said fixated condition as shown in the figures, bridges a gap G between ends 35 of legs of the C-shape. The bracket may easily be mounted to the second frame part 19 by a screw connection as shown.

The example of the method of the invention further comprises, for the purpose of mounting a roller 2 of the plurality of rollers 2 to the frame 3, the following steps. See in particular FIGS. 5A-5F.

Figure 5A:
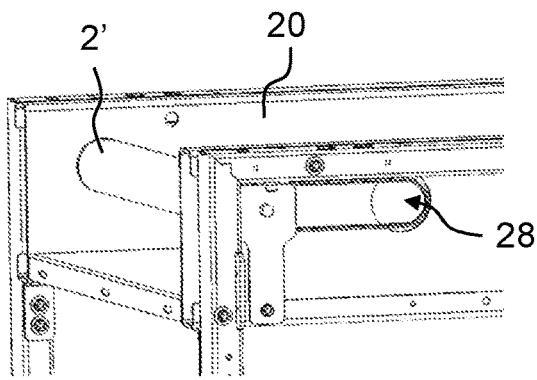
FIGS. 5A-5F show steps of a method of assembling the roller conveyor of FIG. 1.

FIG. 5A shows that a first roller 2' has already been mounted. The use of the reference numerals 2' and 2 is merely for the purpose of explaining the method. The rollers 2' and 2 are identical. The first roller 2' may be connected to a drive means, such as a drive motor, of the conveyor. The first support element 7 of a roller 2 is mounted to a first mounting provision 24 of the first frame part 20, by sticking a pin of the first support element 7 through a passage forming the first mounting provision 24, while leaving the opposite second support element 8 of that roller 2 free from a second mounting provision 26 of the second frame part 22. See FIG. 5B. In more detail, the roller 2 is at least temporarily moved with at least a part of its roller body 6 through a second passage 28, after which the first support element 7 is moved towards the first frame part 18 such that the first support element 7, or at least the mentioned pin thereof, is received in a passage forming the first mounting provision 24 in the first base part 20.

Figure 5B:
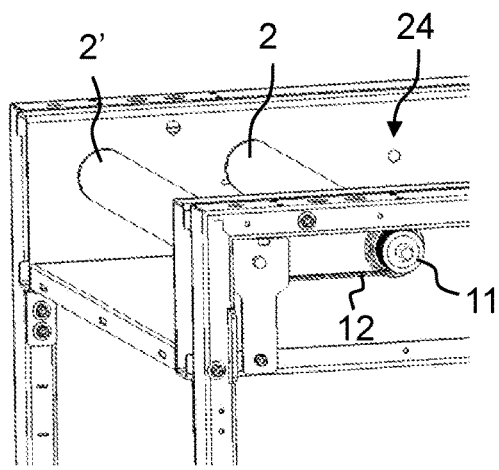
Figure 5C:
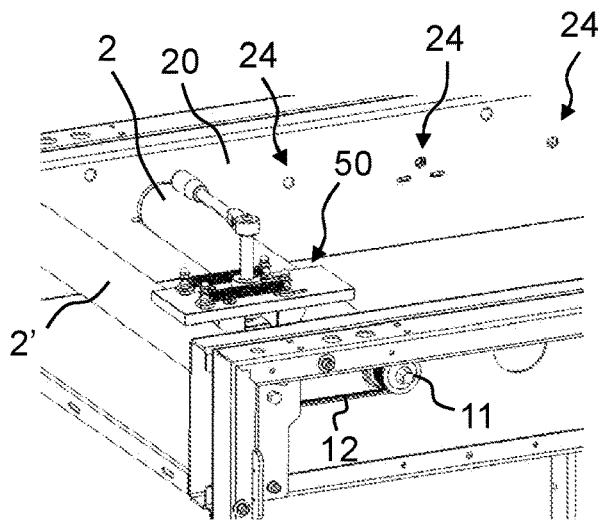
Figure 5D:
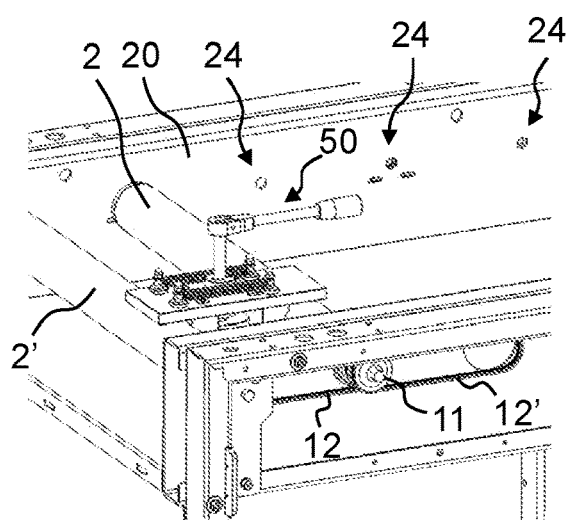
Figure 5E:
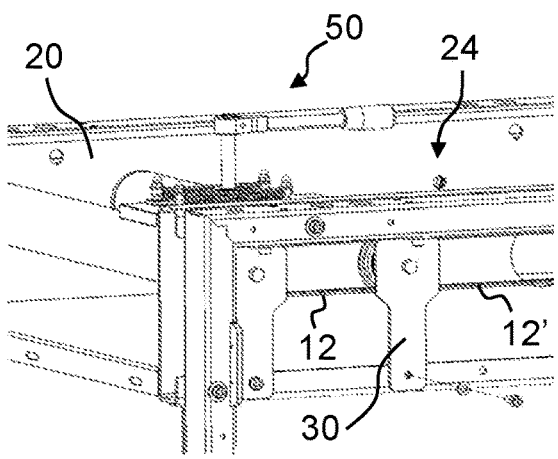
Figure 5F:
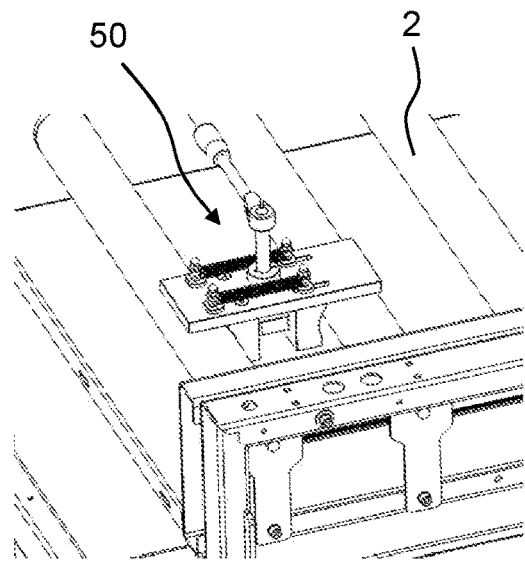
Figure 6:
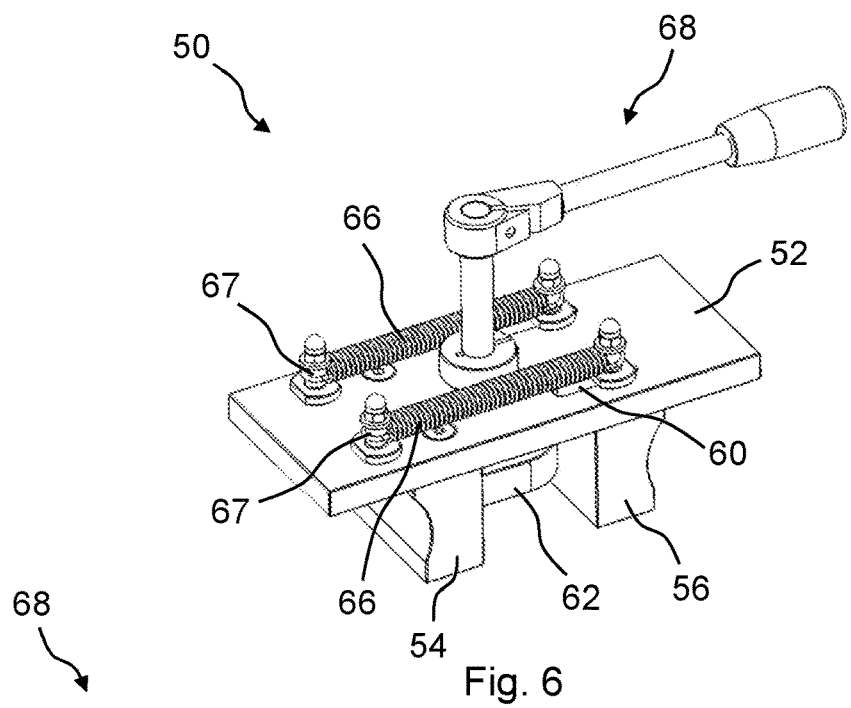
FIG. 6 shows, in 3-dimensional view, an example of a tensioning device according to the present invention.

A drive belt 12 and a further drive belt 12' are passed over the pulley 11 of the roller 2 (FIG. 5B and 5D). As shown, drive belt 12 couples the roller 2 to the first roller 2', which is its previously mounted neighboring roller, so that the rollers 2' and 2 are drivingly connected. The drive belt 12' is still to be passed about another neighboring roller still to be mounted (on the right side of roller 2 in the view of FIGS. 5A-5F). The drive belt 12 is tensioned by exerting a force on the roller 2 by means of a tensioning device 50. FIG. 5C shows a first state of the tensioning device 50 in which it is placed in between the roller 2 and the previously mounted neighboring roller 2'. FIG. 5D shows a second state of the tensioning device 50 in which it exerts a force on the roller 2. The construction of the tensioning device 50 will be further explained below. The second support element 8 of the roller 2 is then mounted to the second mounting provision 26 while keeping the drive belt 12 tensioned by the tensioning device 50. See FIG. 5E, showing that a bracket 30 is placed over the pin 33 of the second support element 8 and fixated to the base part 22 of the second frame part 19 while keeping drive belt 12 tensioned. Then, the tensioning device 50 is removed from the roller 2. These steps are repeated until the plurality of rollers have been mounted to the frame 3 of the roller conveyor 1, thereby assembling the roller conveyor 1. For the purpose of the step of tensioning the drive belt 12 by exerting a force on the roller 2, a force is exerted on the roller body 6 as the figures show.

The mentioned tensioning device 50 for use in the above described example of a method according to the invention, is configured for tensioning an endless flexible drive element passed about respective pulley means of two neighboring rollers 2', 2 of the roller conveyor of which a first roller 2' has already been mounted to the frame of the device and the other roller 2 is to be mounted to the frame, as described in more detail above. The tensioning device 50 is shown in more detail in FIGS. 6 and 7A-7D.

The tensioning device 50 has a body part 52, a first pusher body 54 for contacting the first 2' of the two rollers, fixated on the body part 52 such as by means of a screwed connection as shown or fixated on the body part 52 by manufacturing the body part and the first pusher body 54 as one integral part, for example, or by welding it to the body part. The device 50 also has a second pusher body 56 movably provided on the body part 54, for contacting the roller to be mounted to the frame 3 of the roller conveyor 1. The second pusher body 56 has upward extending pins 58 passing through slots 60 in the body part 52 for the purpose of being movable with respect to the body part 52.

Figure 7A:
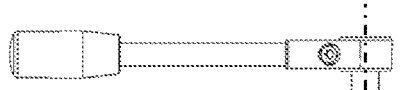
FIGS. 7A and 7B show the tensioning device of FIG. 6 in a first state, seen from the front and obliquely from below.
Figure 7A:
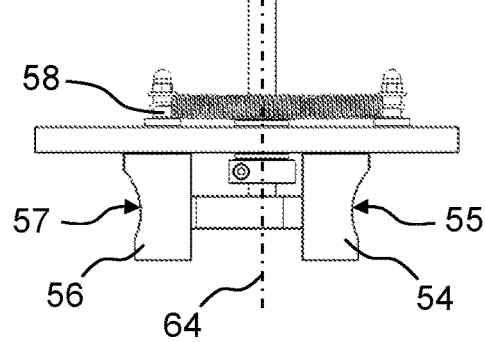
Figure 7B:
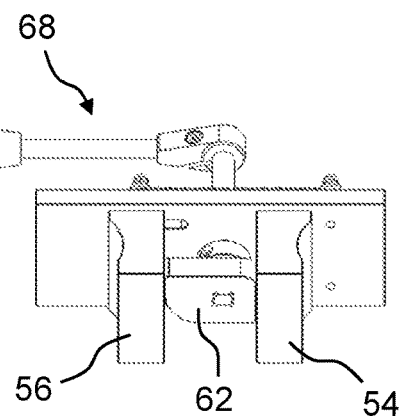
Figure 7C:
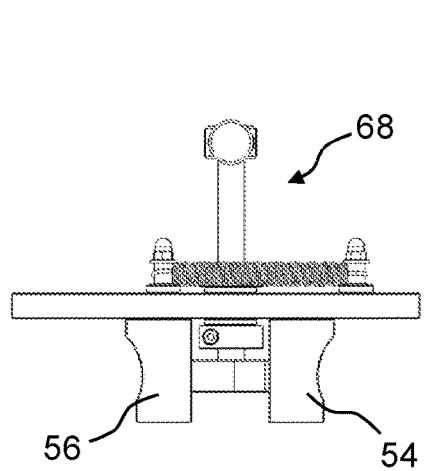
FIGS. 7C and 7D show the tensioning device of FIG. 6 in a second state, seen from the front and obliquely from below.
Figure 7D:
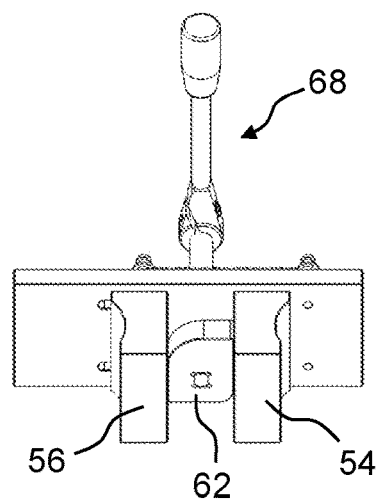

The tensioning device 50 further has a cam 62 between the first 54 and second 56 pusher body, such that pivoting the cam 62 about a pivot axis 64 thereof results in the cam 62 forcing the second pusher body 56 away from the first pusher body 54 thereby exerting a force on the roller to be mounted when provided in between two neighboring rollers, thereby tensioning the drive belt 12 as explained above. As FIGS. 7B and 7D show in particular, the cam is shaped such that upon a counterclockwise pivoting movement about the pivot axis 64, the second pusher body 56 is forced away from the first pusher body 54. FIG. 7D shows a first state of the tensioning device 50 in which the second pusher body 56 is closer to the first pusher body 54 and FIG. 7B shows a second state of the tensioning device 50 in which the second pusher body 56 is further from the first pusher body 54. The first and second pusher bodies 54, 56 are configured for contacting the respective roller bodies 6 of the two neighboring rollers 2', 2. For that purpose, they have respective concave outer surfaces 55 and 57, respectively, the concave surfaces preferably being adapted to the shape of the roller bodies 6.

The second pusher body 56 is spring loaded on the cam 62. This is realized by the two coil springs 66 mounted between fixed mounting pins 67 on the base body and the pins 58 on the second pusher body 56, and exerting a pulling force on the pins 58 such that the second pusher body 56 is pulled towards the first pusher body 54 and thereby against the cam 62. The tensioning device 50 further has a lever 68 connected to the cam 62, which lever 68 is configured be manually operated and is configured such that upon pivoting the lever 68 about a pivot axis thereof, which is in the present example the pivot axis 64, the cam 62 pivots about the pivot axis 64 as well.

Other variations to the disclosed embodiments can be understood and effected by those skilled in the art in practicing the claimed invention, from a study of the drawings, the disclosure, and the appended claims. The foregoing description provides embodiments of the invention by way of example only. The scope of the present invention is defined by the appended claims. One or more of the objects of the invention are achieved by the appended claims.

What is claimed is:

1. A method for assembling a roller conveyor having a plurality of successive, driven rollers mounted at a predefined pitch on a frame of the roller conveyor, the successive rollers supporting and conveying products in use of the roller conveyor, the method comprising the steps of:
    providing the plurality of successive rollers each having a cylindrical roller body and a first and a second support element on respective opposite ends of the roller body, the second support element having pulley means,
    providing a frame having a first and a second, mutually parallel, elongate frame parts for mounting therebetween the plurality of successive rollers, wherein the first and second frame part each have a plurality of mounting provisions spaced apart at the pitch, the method further comprising, for the purpose of mounting a first roller of the plurality of rollers to the frame, the further steps of:
    mounting the first support element of the first roller to a first mounting provision of the first frame part while leaving the opposite second support element of the first roller free from a second mounting provision of the second frame part,
    passing a first endless flexible drive element and a second endless flexible drive element over the pulley means of the first roller,
    wherein the first drive element also passes over a pulley means of a previously mounted neighbouring roller and wherein the second drive element is still to be passed about another neighbouring roller still to be mounted,
    tensioning the first drive element by exerting a force on the first roller by means of a tensioning device,
    mounting the second support element of the first roller to the second mounting provision while keeping the first drive element tensioned by the tensioning device, and then
    removing the tensioning device from the first roller.

2. The method according to claim 1, wherein the first mounting provisions of the first frame part are formed by a plurality of first passages spaced apart at the pitch in a first base part of the first frame part, each passage for receiving therein the first support element of one of the plurality of rollers and for preventing the first support element from moving perpendicular to a longitudinal direction of the roller.

3. The method according to claim 1, wherein the second frame part has a plurality of second passages spaced apart at the pitch, through each of which second passages a roller body can pass, wherein for the purpose of the step of mounting the first support element, the first roller is at least temporarily moved with at least a part of its roller body through a second passage of said series of second passages.

4. The method according to claim 1, wherein for the purpose of the step of tensioning the first drive element by exerting a force on the first roller, a force is exerted on the roller body of the first roller.

5. The method according to claim 1, wherein for the purpose of the step of tensioning the first drive element by exerting a force on the first roller, the tensioning device is placed between the first roller and the previously mounted neighbouring roller.

6. The method according to claim 1, wherein each second mounting provision has a removable bracket which can be fixated onto a second base part of the second frame part, wherein for the purpose of the mounting of the second support element of the first roller to the second mounting provision while keeping the first drive element tensioned by the tensioning device, the bracket is fixated to the second base part.

7. The method according to claim 6, wherein the removable bracket has a bracket passage for receiving therein the second support element of the first roller and for preventing the second support element from moving perpendicular to a longitudinal direction of the first roller.

8. The method according to claim 7, wherein for the purpose of the step of mounting the first support element of the first roller,
    the first roller is at least temporarily moved with at least a part of its roller body through a second passage provided in the second frame part, after which
    the first support element is moved towards the first frame part such that the first support element of the first roller is received in a passage in a first base part of the first frame part,
    wherein subsequently,
    for the purpose of the step of tensioning the first drive element by exerting a force on the first roller,
    a force is exerted on the roller body of the first roller, after which,
    for the purpose of the step of mounting the second support element to the second mounting provision,
    the bracket is positioned such that the second support element is received in the bracket passage, after which the bracket is fixated to the second base part.

9. The method according to claim 7, wherein the bracket and the second base part enclose the pulley means of the first roller between them at least in a fixated condition of the bracket on the second base part.

10. The method according to claim 6, wherein the bracket and the second base part enclose the pulley means between them at least in a fixated condition of the bracket on the second base part, wherein the second base part has a C-shaped cross section wherein the bracket, in said fixated condition, bridges a gap between ends of legs of the C-shape.

* * * * *